(12) United States Patent
Cherkaoui et al.

(10) Patent No.: US 10,577,871 B2
(45) Date of Patent: Mar. 3, 2020

(54) SUBSEA PIPE-IN-PIPE STRUCTURES

(71) Applicant: Acergy France SAS, Suresnes (FR)

(72) Inventors: Saad Cherkaoui, Suresnes (FR); Nathalie Delaunay, Saint Germain en Laye (FR); Gerald Gerometta, Paris (FR)

(73) Assignee: Acergy France SAS, Suresnes (FR)

( * ) Notice: Subject to any disclaimer, the term of this patent is extended or adjusted under 35 U.S.C. 154(b) by 128 days.

(21) Appl. No.: 15/547,702

(22) PCT Filed: Jan. 27, 2016

(86) PCT No.: PCT/IB2016/000238
§ 371 (c)(1),
(2) Date: Jul. 31, 2017

(87) PCT Pub. No.: WO2016/125021
PCT Pub. Date: Aug. 11, 2016

(65) Prior Publication Data
US 2018/0087694 A1 Mar. 29, 2018

(30) Foreign Application Priority Data

Feb. 3, 2015 (GB) .................................. 1501775.9
Mar. 30, 2015 (GB) .................................. 1505466.1

(51) Int. Cl.
*F16L 53/00* (2018.01)
*E21B 17/00* (2006.01)
(Continued)

(52) U.S. Cl.
CPC .......... *E21B 17/003* (2013.01); *E21B 36/003* (2013.01); *E21B 36/005* (2013.01);
(Continued)

(58) Field of Classification Search
CPC ............ F16L 53/38; F16L 9/18; E21B 17/003
(Continued)

(56) References Cited

U.S. PATENT DOCUMENTS

RE16,523 E * 1/1927 Bille ...................... B28B 21/44
138/144
2,440,245 A * 4/1948 Chevigny ............... H01J 19/36
138/111
(Continued)

FOREIGN PATENT DOCUMENTS

DE 39 31 058 7/1990
EP 0 036 032 9/1981
(Continued)

OTHER PUBLICATIONS

API Specification 5L, "Specification for Line Pipe," American Petroleum Institute, Dec. 2012 (45th ed.).
(Continued)

*Primary Examiner* — James F Hook
(74) *Attorney, Agent, or Firm* — Levy & Grandinetti

(57) ABSTRACT

A pipe-in-pipe assembly with thermally-insulating spacers positioned in an annulus to act radially between inner and outer pipes is disclosed. The spacers have at least one circumferentially-extending array of circumferentially-spaced ribs that define longitudinally-extending passageways in gaps between neighbouring ribs of the array. Cables including heating elements extend longitudinally along, the annulus outside the inner pipe. The cables extend longitudinally along the passageways. At least one insulation layer disposed radially outboard of the cables has insulating elements disposed in the gaps between the ribs and/or an insulating layer extending around the inner pipe, positioned radially outboard of the ribs and bridging the gaps. Bands encircle and retain components of the insulation layer. Insulation may also be disposed on the inner pipe between
(Continued)

first and second arrays of ribs, those arrays being spaced longitudinally from each other.

18 Claims, 5 Drawing Sheets

(51) Int. Cl.
| F16L 59/065 | (2006.01) |
| F16L 1/12 | (2006.01) |
| F16L 1/16 | (2006.01) |
| F17D 1/18 | (2006.01) |
| E21B 36/04 | (2006.01) |
| E21B 43/01 | (2006.01) |
| H05B 3/42 | (2006.01) |
| F16L 7/00 | (2006.01) |
| F16L 53/38 | (2018.01) |
| F17D 3/01 | (2006.01) |
| F16L 9/18 | (2006.01) |
| F16L 53/30 | (2018.01) |
| E21B 36/00 | (2006.01) |
| E21B 43/013 | (2006.01) |
| F16L 7/02 | (2006.01) |
| F16L 9/19 | (2006.01) |

(52) U.S. Cl.
CPC .............. *E21B 36/04* (2013.01); *E21B 43/01* (2013.01); *E21B 43/013* (2013.01); *F16L 1/123* (2013.01); *F16L 1/16* (2013.01); *F16L 7/00* (2013.01); *F16L 7/02* (2013.01); *F16L 9/18* (2013.01); *F16L 9/20* (2013.01); *F16L 53/30* (2018.01); *F16L 53/38* (2018.01); *F16L 59/065* (2013.01); *F17D 1/18* (2013.01); *F17D 3/01* (2013.01); *H05B 3/42* (2013.01); *F16L 9/19* (2013.01); *H05B 2214/03* (2013.01)

(58) Field of Classification Search
USPC .................. 138/33, 108, 114, 112, 113, 148
See application file for complete search history.

(56) References Cited

U.S. PATENT DOCUMENTS

| 3,374,308 | A | * | 3/1968 | Haas | .......................... F16L 7/00 |
| | | | | | 138/113 |
| 3,540,487 | A | | 11/1970 | LoRusso | |
| 3,971,416 | A | * | 7/1976 | Johnson | .................. F16L 59/18 |
| | | | | | 138/33 |
| 4,182,378 | A | | 1/1980 | Dieter | |
| 4,240,850 | A | | 12/1980 | Arntz | |
| 4,351,365 | A | | 9/1982 | Bauermeister et al. | |
| 4,984,633 | A | | 1/1991 | Langer | |
| 5,069,255 | A | * | 12/1991 | Muszynski | ............. E04C 2/328 |
| | | | | | 138/149 |
| 5,497,809 | A | * | 3/1996 | Wolf | ........................ F16L 9/18 |
| | | | | | 138/113 |
| 5,732,746 | A | | 3/1998 | Leroy et al. | |
| 5,803,127 | A | | 9/1998 | Rains | |
| 6,634,388 | B1 | * | 10/2003 | Taylor | .................... B29C 63/34 |
| | | | | | 138/104 |
| 6,786,677 | B2 | * | 9/2004 | Finzel | .................. G02B 6/4463 |
| | | | | | 138/112 |
| 6,926,039 | B2 | * | 8/2005 | Marion | ................. F16L 11/081 |
| | | | | | 138/114 |
| 7,694,733 | B2 | | 4/2010 | Clark et al. | |
| 2003/0175084 | A1 | | 9/2003 | Finzel et al. | |
| 2003/0178842 | A1 | | 9/2003 | Gallagher | |
| 2004/0245768 | A1 | | 12/2004 | Giacomelli et al. | |
| 2005/0212285 | A1 | | 9/2005 | Haun | |
| 2013/0014833 | A1 | * | 1/2013 | Geertsen | ................. H05B 6/56 |
| | | | | | 137/341 |

FOREIGN PATENT DOCUMENTS

| GB | 1 237 470 | 6/1971 |
| GB | 2492883 | 1/2013 |
| WO | WO 02/16732 | 2/2002 |
| WO | WO 2004/013530 | 2/2004 |
| WO | WO 2007/057695 | 5/2007 |
| WO | WO 2009/083937 | 7/2009 |
| WO | WO 2014/029644 | 2/2014 |
| WO | WO 2016/125024 | 8/2016 |

OTHER PUBLICATIONS

API Recommended Practice 1111, Design, Construction, Operation, and Maintenance of Offshore Hydrocarbon Pipelines (Limit State Design), Sep. 2015 (5th ed.).

* cited by examiner

SUBSEA PIPE-IN-PIPE STRUCTURES

This invention relates to rigid pipelines of pipe-in-pipe ('PIP') construction that are suitable for subsea applications. More specifically, the invention relates to electrically trace-heated PiP (ETHP) pipeline that is heated for flow assurance.

Subsea pipelines are used as 'tie-backs' to transport crude oil and/or natural gas from a subsea wellhead across the seabed on the way to the surface. Typically, in offshore locations, the oil and/or gas then flows up a riser from the seabed to the surface to undergo treatment and temporary storage at a surface installation.

Oil and gas are present in subterranean formations at elevated temperature and pressure, which may be increased by the injection of fluids such as steam. On production of the oil or gas, the produced fluid emerges from the wellhead and enters a subsea pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high despite thermal exchange with the surrounding seawater, which is invariably much colder.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. When production restarts, temperature within the pipeline must be increased quickly so that no plugs will form.

The challenges of thermal management increase as subsea pipelines become longer. In this respect, there is a trend toward longer tie-backs as oil and gas reserves are being exploited in increasingly challenging locations.

Designers of subsea pipelines have adopted both passive and active approaches to thermal management, either individually or in combination.

In passive thermal management systems, the pipeline is thermally insulated to retain heat in the pipeline. Conversely, active thermal management systems add heat to the pipeline. For example, heat may be added by thermal exchange with hot fluids flowing along or around the pipeline. In an alternative approach, heat may be added by electrical heating systems.

An example of passive thermal management is a PiP structure comprising a fluid-carrying inner pipe positioned concentrically within an outer pipe. The inner and outer pipes are spaced from each other to define an insulating annulus between them. Typically, insulating material is disposed in the annulus; it is also possible to draw down a partial vacuum in the annulus to reduce transmission of heat through the annulus.

PiP structures provide high-performance thermal insulation by virtue of the annulus. Their double-walled construction also enhances mechanical strength and leak protection.

As a common example of active thermal management, a trace heating system typically employs resistive electrical wires running along, and in thermal contact with, the outer surface of a steel pipeline. Heat produced by passing an electric current along the wires is conducted through the pipe wall to the production fluid flowing within. An example of an electrically trace-heated flowline is disclosed in WO 02/16732.

Electrically trace-heated PiP, or ETHP, employs a combination of passive and active thermal management measures to manage the temperature of production fluids particularly effectively. GB 2492883 and WO 2014/029644 disclose typical electrically trace-heated PiP flowline sections. A further example of electrically trace-heated PiP is shown in FIG. 1 of the drawings.

In a length of electrically trace-heated PiP as shown in FIG. 1, low-voltage electric heating elements 10 such as copper wires are disposed around an inner pipe 12 of a PiP assembly 14. Thus, the heating elements 10 lie within the annulus 16 defined between the inner pipe 12 and an outer pipe 18 of the PiP assembly 14. In this example, the heating elements 10 extend longitudinally along the PiP assembly 14 in parallel to its central longitudinal axis, although the heating elements 10 could instead be twisted helically around the inner pipe 12 or arranged in a wave pattern—known in the art as an S-Z layout—along the inner pipe 12. One or more other longitudinally-extending elements 20 such as data cables or power cables may be positioned beside and between the heating elements 10. The annulus 16 may also contain an insulating layer 22 that overlays the heating elements 12 and other elements 20 as shown. Again, air may be evacuated from the annulus 16.

Although not shown in FIG. 1, electrical power is suitably provided to the heating elements 10 by subsea electrical cables that are connected to the electrically trace-heated PiP system underwater via wet-mateable electrical connectors. Another approach is to splice an end of the heating elements 10 to a subsea electrical cable above the surface, aboard an installation vessel.

Whatever thermal management system is employed, it is important to maintain thermal management continuously along the length of a pipeline. Otherwise, 'cold spots' will arise, which increase the likelihood of plugs forming at those locations. Also, the inner and outer pipes of a PiP system have to be held spaced apart to maintain the intermediate annulus.

In short PiP sections, namely pipe joints that are typically a standard 12 m in length, the inner and outer pipes are usually held apart only by connecting end walls. A succession of such PiP sections may be welded together end-to-end to form a pipeline of any desired length, in which the annulus is interrupted between abutting sections.

Longer PiP sections form pipe stalks that may be many hundreds of metres in length. Such pipe stalks may comprise several successive pipe sections fabricated into inner and outer pipe strings, in which case the annulus may extend continuously between abutting pipe sections without interruption. The absence of end walls between the successive pipe sections means that longer PiP sections require spacing supports between the inner pipe string and the outer pipe string.

The spacing supports may comprise a series of spacers or centralisers, or a solid layer of thermal insulation arranged in the annulus between the inner and the outer pipe strings.

Like an insulation layer, spacers or centralisers in PiP systems that carry produced fluid must be designed to reduce heat transfer between the inner pipe string and the outer pipe string. This is because a cold spot caused by thermal conduction through a spacer or centraliser from the warmer inner pipe string to the colder outer pipe string could promote the precipitation of a solid plug of wax, asphaltene or gas hydrate from the production fluid.

Conventional methods for fabricating a PiP system start with preparing an inner pipe and placing the inner pipe into an outer pipe. Commonly, several successive sections are tied-in by welding together successive inner pipes followed by successive outer pipes. It is also known to fabricate an outer shell to close a gap in the outer pipe wall after welding together the inner and outer pipes. However, as welding or tie-in operations can be difficult and as additional welding is undesirable, it may be preferred to pre-fabricate a long inner pipe string and a similarly long outer pipe string or 'pipe stalk'. Then, the inner pipe string, complete with spacing supports and heating wires, is inserted telescopically into the outer pipe string.

Once closed, the annulus of a PiP pipeline can be evacuated on an installation vessel offshore. However, if possible, the annulus of a PiP pipeline is evacuated during an onshore pre-fabrication process as this removes that operation from the critical path during subsequent offshore operations.

Specifically, PiP pipelines may be fabricated offshore on, and laid from, an installation vessel using J-lay or S-lay techniques. In those techniques, PiP pipe joints are welded successively at field joints to an upper end of a pipe string extending as a catenary toward the seabed from a hang-off mechanism or tensioner of the vessel. The welds are tested and the field joints are coated before each new section of the pipe string is launched into the sea.

PiP pipelines may also be laid in reel-lay operations, in which the pipeline is prefabricated at a coastal spoolbase that a reel-lay vessel visits for loading. At the spoolbase, the pipeline is spooled onto a reel carried by the vessel. During subsequent pipelaying at sea, the pipeline is unspooled from the reel, straightened and launched into the sea.

It is inevitable that pipelines will bend to some extent along their length during installation. Bending is essentially elastic in S-lay and J-lay operations but when a pipeline is installed by the reel-lay method, it typically experiences 2% bending strain—involving plastic deformation—on spooling and straightening. When the pipeline is a PiP pipeline, both the inner pipe and the outer pipe are deformed; also, the inner pipe may move relative to the outer pipe. Eventually, structures disposed in the annulus may be crushed at the intrados of a pipe bend.

Whilst crush forces may be absorbed to some extent by an insulation layer, cables or other longitudinally-extending elements arranged under the insulation layer are susceptible to damage. For example, the pinching action of crushing prevents cables sliding or moving relative to the inner and outer pipes during successive bending cycles. This may cause the cables to stretch longitudinally; conversely, longitudinal compression can also damage the cables.

A typical spacer for a PiP assembly is described in WO 2007/057695. It is ring-shaped, continuous and extends radially in transverse cross-section. It does not allow a heating element or a fibre-optic cable to extend longitudinally along the outside of the inner pipe.

A waterstop spacer is disclosed in WO 2004/013530. It is a full sealing ring that has passages for cables. A sealing arrangement prevents water ingress through the passages. Drawbacks of this design are its bulk and also that it creates a discontinuity in the thermal insulation system. The ring becomes a thermal bridge between the inner and outer pipes, which is a disadvantage for thermal insulation. Also, the ring cannot easily slide inside the outer pipe, which is a disadvantage for manufacturing the PiP assembly.

Continuous helical spacers are also known in which the spacer is wound all around the pipe for a given distance, an example being disclosed in EP 0036032. GB 1237470 shows another continuous helical spacer structure. A drawback of a continuous spacer is that it increases the area of thermal contact between the inner and outer pipes, creating thermal bridges and cold spots that may be detrimental to flow assurance in the inner pipe. In addition, it is difficult to connect the ends of cables.

U.S. Pat. No. 4,351,365 discloses a spacer made of polyurethane (PU) foam: triangle shapes are cut in the foam, which is on a ribbon, so that the spacer ribbon may be wrapped around the inner pipe. This restricts the surface area of thermal contact to limited lines or points but it cannot accommodate heating wires in thermal contact with the inner pipe.

DE 3931058 teaches the use of short, discrete ribs as spacers. The spacers are metallic and are welded to the inner pipe. Consequently, the spacers create thermal bridges and hence cold spots in the inner pipe wherever there is contact with the outer pipe.

Rib centralisers are well known in the more remote technical field of drilling casings. For example, in U.S. Pat. Nos. 7,694,733 and 4,984,633, the inner pipe of the casing comprises short, partially helical outer ribs. The purpose of the ribs is not just spacing but also to optimise fluid circulation within the annulus of the casing. Thermal insulation is not a concern in that technical field. Thus, the ribs touch the outer pipe and are generally metallic for improved mechanical resistance. This is not suitable for the purposes of the invention as it would create an unacceptable thermal bridge between the inner and outer pipes of a PiP assembly.

Prior art as described above does not teach spacing for mechanical resistance during installation, thermal insulation and compliance with electrical heating elements. Consequently, the invention addresses the problem of creating an easily-assembled PiP structure that protects cables or other longitudinally-extending elements from crushing and pinching, while ensuring effective thermal insulation in use.

The invention involves thermally uncoupling the inner and outer pipe of a PiP structure while retaining mechanical coupling across the annulus between the pipes. It does so by placing spacers that isolate the annulus and that can withstand mechanical loads, especially radially-inward crush loads experienced during installation that put the spacers under compressive stress where the annulus tends to narrow.

Broadly, the invention resides in a pipe-in-pipe assembly comprising inner and outer pipes in spaced concentric relation to define an annulus between them. The annulus defines a thermally-isolating gap between the pipes. A plurality of cables, which may comprise heating elements and/or data cables, extends longitudinally along the annulus outside the inner pipe.

The annulus also contains thermally-insulating protection spacers interposed between the pipes. The spacers are thick enough and stiff enough to ensure that the gap between the pipes remains greater than the thickness of any of the cables. The spacers are preferably carried by the inner pipe and face radially outwardly toward the outer pipe. In that case, a gap of less than 10 mm is preferably left between the radially outer side of a spacer and the inner face of the outer pipe. The spacers may thus be positioned conveniently on the inner pipe before placing the outer pipe around the inner pipe and the spacers. However, in principle, the spacers could be carried inside the outer pipe to face radially inwardly toward the inner pipe.

It is important to appreciate that the spacers contemplated by the invention are so called because they ensure sufficient space in the annulus to avoid crushing or pinching of the heating elements or other cables placed there. The spacers need not necessarily be in simultaneous or permanent contact with either or both the inner and outer pipes. In particular, a spacer mounted on an inner pipe may never touch the outer pipe, either because the annulus does not narrow at that location or because, as noted below, there may be an insulating layer interposed between the spacer and the outer pipe.

To the contrary, radial clearance between the spacers and at least one of the inner and outer pipes is desirable to reduce thermal bridging and to ease assembly of the PiP structure by telescopic insertion. The spacers of the invention could instead be called protectors or bumpers, in that only some of them need only be in simultaneous contact with both the inner and outer pipes where the annulus narrows to squeeze those spacers between the pipes. The squeezed spacers resist further narrowing of the annulus at that location by applying reaction forces to the pipes and thus protect the cables at that location by maintaining a sufficient space around the cables.

The spacers comprise first and second circumferentially-extending arrays of circumferentially-spaced discrete ribs that optionally lie in the same transverse cross-section through the assembly. The first and second arrays are spaced longitudinally from each other. The ribs may, for example, be moulded of a polymer material such as polyurethane or polyamide. The ribs may define a radially inner face of a spacer array and/or a radially outer face of a spacer array.

Longitudinally-extending passageways such as grooves or channels are defined in gaps between circumferentially-successive ribs of the arrays. At least one of the cables runs longitudinally along at least one of the passageways. For example, the passageways, each containing at least one cable, alternate circumferentially with the ribs.

Where a cable is a heating element, it is positioned in a passageway for thermal contact with the inner pipe for conduction of heat to the inner pipe. Preferably this is achieved by direct contact between the heating element and the inner pipe.

The spacers of the PiP assembly comprise more than one circumferentially-extending array of circumferentially-spaced discrete ribs. Such arrays are spaced longitudinally or axially along the inner pipe. The distance between successive arrays in the axial direction may, for example, be more than 1.50 m. By way of example, the ribs of the or each array may be 20 cm to 60 cm long.

The assembly further comprises at least one insulation layer, which may be made up of longitudinally- or circumferentially-spaced insulating elements. An insulation layer or an insulating element may, for example, be made of one or more blankets or sheets of insulating material.

An insulation layer, or one or more insulating elements, may extend between all of the spacers. An insulation layer, or one or more insulating elements, may lie between arrays of spacers. An insulation layer, or one or more insulating elements, may cover the inner pipe and the cables, hence lying on the radially outer side of the inner pipe and the cables, but not the radially outer sides of the spacers themselves. In that case, the outer side of a spacer may be covered with a material to ease sliding contact with the outer pipe, such as nylon or PTFE. However, an insulation layer, or one or more insulating elements, may instead or additionally cover the inner pipe, the cables and the spacers. Thus, the spacers may be radially inboard of the or each layer of thermal insulation.

A circumferential containment band or sleeve such as a tape, strap, or web may surround, retain or support an insulation layer or one or more insulating elements. Similarly, a circumferential band or sleeve may surround, retain or support all of the ribs of an array in the same transverse cross-section. Such a band or sleeve may be flexible for shaping to match the pipe radius upon assembly or substantially rigid if it is pre-shaped to match the pipe radius. For example, the ribs of an array may be mounted on or retained by a pliant or flexible tape, an elastic sleeve, a heat-shrink sleeve or a metallic strap whose diameter can be decreased in a tightening operation.

A circumferential band or sleeve may be wrapped and tightened around the insulation layer, the ribs and/or the cables to jam the insulation layer, the ribs and the cables at a given position and to conform the insulation layer with the ribs and the cables.

A circumferential band or sleeve may be separate from the ribs or may be integral with the ribs, for example by being moulded in the same polymer material.

A circumferential band or sleeve may lie on a radially outer side of the ribs, where it may conveniently retain the cables in passageways between the ribs, or on a radially inner side of the ribs, where it may be conveniently wrapped around the inner pipe. It is also possible for a circumferential band or sleeve to lie at a radially intermediate position between radially outer and inner faces of the ribs.

In some embodiments of the invention, the ribs are joined in a pre-shaped spacer element that is inserted into the annulus when making the PiP assembly. For ease of assembly, a circumferential array of ribs may be assembled from part-circumferential spacer elements. Such spacer elements are circumferentially discontinuous, being penetrated or bounded by gaps, grooves, holes or other openings spaced circumferentially around the inner pipe to accommodate the cables.

At least one heating element or other cable may be radially inboard of a spacer element positioned in the annulus. The or each cable may therefore extend along a longitudinal passageway between the spacer element and an external surface of the inner pipe. For example, a radially inward side of a spacer element may be shaped to define one or more longitudinal passageways to accommodate the or each cable between successive ribs of the spacer element.

Thus, the ribs of an array may be mounted on or may be integral with two or more part-circular spacer elements of self-supporting rigidity that can be assembled together around the inner pipe. Such elements may comprise curved bands or webs of metals or plastics that join the ribs or are integral with the ribs.

The cables may extend substantially parallel to each other and to a central longitudinal axis of the PiP assembly. Alternatively the cables may be substantially angularly offset from the central longitudinal axis, for example in a helical arrangement in which parallel cables twist around the inner pipe as they extend along its length. In some embodiments of the invention, the cables and the ribs may lie at an angle of greater than 10° relative to the central longitudinal axis of the assembly. The cables and the ribs preferably lie at the same angle but not necessarily so, particularly if there is sufficient circumferential clearance between successive ribs for the cables to be out of alignment with the ribs.

Thus, a pipe-in-pipe assembly of the invention comprises thermally-insulating spacers positioned in an annulus to act radially between inner and outer pipes. The spacers comprise first and second circumferentially-extending and longitudinally spaced arrays of circumferentially-spaced ribs that define longitudinally-extending passageways in gaps between neighbouring ribs of the arrays. Cables including heating elements extend longitudinally along the annulus outside the inner pipe and along the passageways.

At least one insulation layer disposed radially outboard of the cables comprises insulating elements disposed in the gaps between the ribs and/or an insulating layer extending around the inner pipe, positioned radially outboard of the ribs and bridging the gaps. Bands encircle and retain components of the insulation layer. Insulation may also be disposed on the inner pipe between first and second arrays of ribs, those arrays being spaced longitudinally from each other.

The inventive concept extends to a spacer array for the assembly of the invention, and to a PiP pipeline comprising the assembly or spacer arrays of the invention.

The inventive concept also embraces a method of assembling a pipe-in-pipe structure. The method comprises:
  positioning first and second circumferentially-extending arrays of thermally-insulating spacers at longitudinally spaced locations around an inner pipe, the arrays comprising circumferentially-spaced ribs defining longitudinally-extending passageways in gaps between neighbouring ribs of the arrays;
  positioning a plurality of cables on the outside the inner pipe such that the cables extend longitudinally along the passageways, wherein the radial thickness of the ribs is greater than the thickness of any of the cables; and
  positioning at least one insulation layer radially outboard of the cables.

The arrays of spacers may be positioned before or after positioning the plurality of cables.

The invention is particularly concerned with rigid pipelines. In this respect, it is important to understand that the terms 'rigid' and 'flexible' as applied to pipes have clear meanings in the subsea oil and gas industry that differ in important respects from general language. For example, nominally 'rigid' pipes have enough flexibility to be bent if a minimum bend radius is observed. Yet, such pipes are not regarded in the industry as being 'flexible'.

Rigid pipes used in the subsea oil and gas industry are specified in API Specification 5L and Recommended Practice 1111. In contrast to flexible pipes, a rigid pipe usually consists of or comprises at least one pipe of solid steel or steel alloy. However, additional elements can be added, such as an internal liner layer or an outer coating layer. Such additional elements can comprise polymer, metal or composite materials. Rigid pipe joints are typically terminated by a bevel or a thread, and are assembled end-to-end by welding or screwing them together.

The allowable in-service deflection of rigid steel pipe is determined by the elastic limit of steel, which is around 1% bending strain. Exceeding this limit caused plastic deformation of the steel. It follows that the minimum bend radius of rigid pipe used in the subsea oil and gas industry is typically around 100 to 300 metres depending upon the cross-sectional dimensions of the pipe. However, slight plastic deformation can be recovered or rectified by mechanical means, such as straightening. Thus, during reel-lay installation of a rigid pipeline made up of welded rigid pipe joints, the rigid pipeline can be spooled on a reel with a typical radius of between 8 and 10 metres. This implies a bending strain above 2% for conventional diameters of rigid pipes, requiring the pipeline to be straightened mechanically upon unspooling. Thus, to allow spooling for reel-lay operations, the assembly of the invention can preferably withstand a bending strain of up to 2% without sustaining permanent damage.

Reference has already been made to FIG. 1 of the appended drawings, which is a cut-away perspective view of a length of electrically trace-heated PiP pipeline known in the prior art. In order that the invention may be more readily understood, reference will now be made, by way of example, to the remaining drawings in which.

Figure 1:
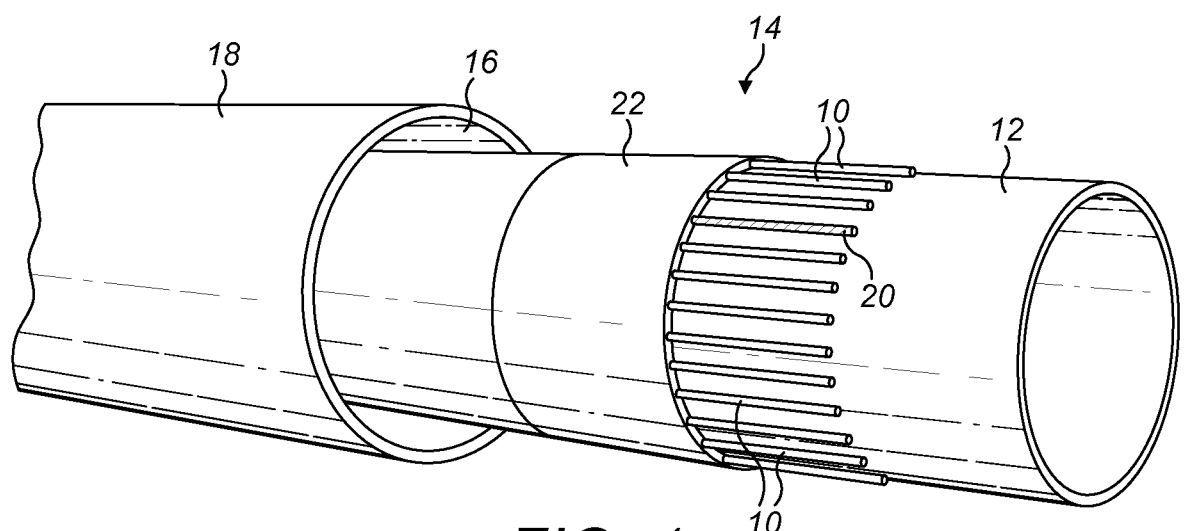

Where appropriate, like numerals are used for like parts in FIGS. 2 to 15. With the exception of FIG. 7, these drawings are schematic, simplified views that show only a few heating elements 10, widely spaced for clarity. In practice, there will be more heating elements 10, relatively closely spaced, as FIGS. 1 and 6 will make clear.

Figure 2:
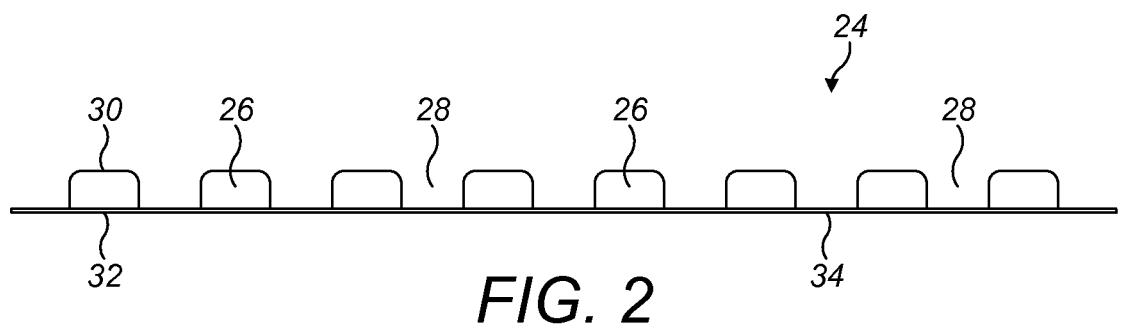
FIG. 2 is a schematic end view of an array of spacer ribs in accordance with the invention, to which a tape is attached.
Figure 3:
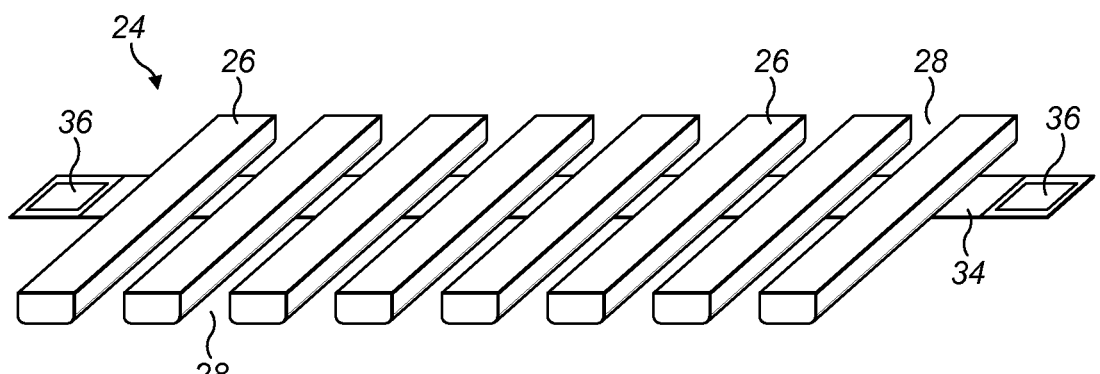
FIG. 3 is a schematic perspective view of the array shown in FIG. 2, but inverted.

FIGS. 2 and 3 show a spacer array 24 before installation into a PiP assembly, whereupon the spacer array 24 is wrapped around the inner pipe 12 of the assembly.

The spacer array 24 comprises parallel elongate ribs 26 that are spaced apart from neighbouring ribs 26 to define gaps 28 between them. Each rib 26 has opposed faces 30, 32 and is moulded of a thermally- and electrically-insulating plastics material such as polyurethane or polyamide. The faces 30, 32 of the ribs 26 lie in parallel planes, each plane being shared by corresponding faces 30, 32 of the ribs 26. When the spacer array 24 is wrapped around the inner pipe 12 as part of the PiP assembly, the opposed faces 30, 32 of the ribs 26 bear against the outside of the inner pipe 12 and face toward the inside of the outer pipe 18.

Figure 15:
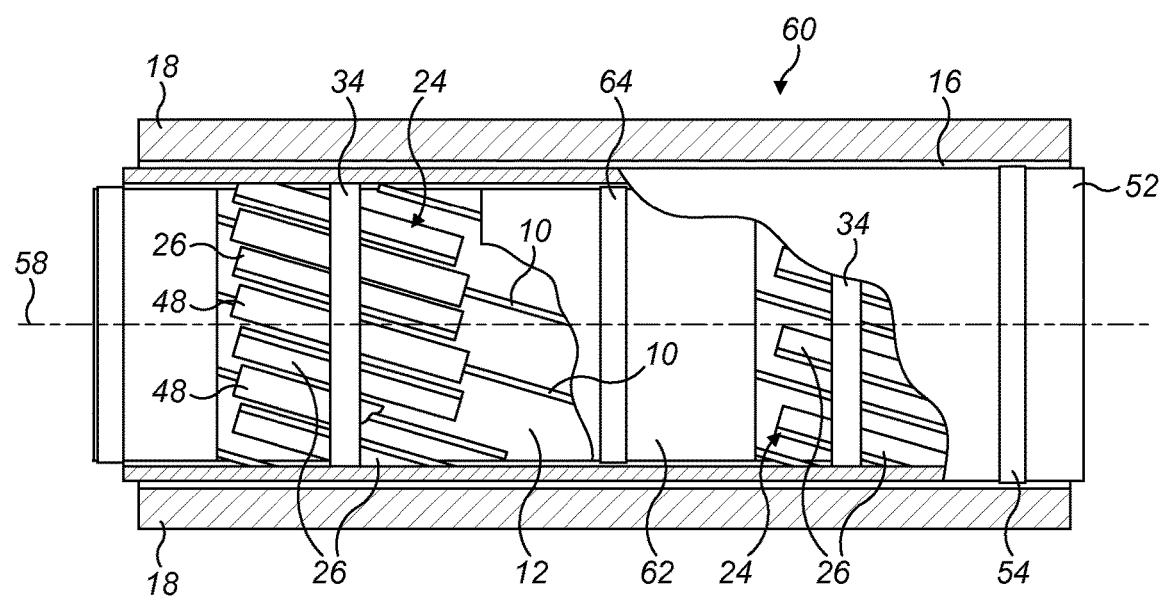

The ribs 26 are spaced along a flexible band or tape 34 that is attached to the faces 30, 32 on one side of the ribs 26. The tape 34 extends transversely, preferably orthogonally, with respect to the alignment of the ribs 26. Thus, when the spacer array 24 is wrapped around the inner pipe 12 with the tape 34 on a plane orthogonal to the central longitudinal axis of the inner pipe 12, the ribs 26 are aligned in parallel with respect to that axis. If the ribs 26 are instead to be angled with respect to the central longitudinal axis of the inner pipe 12 to suit a helical arrangement of heating elements 10, the ribs 26 may instead lie in diagonal relation to the tape 34 as shown in FIG. 15.

The tape 34 may be integral with the ribs 26 or may be attached to the ribs 26 by bonding with adhesives or by welding or fusing. Fastenings 36 at the ends of the tape 34 may be engaged to each other when the tape 34 encircles the inner pipe 12 of a PiP assembly, for example by adhesion of overlapping ends.

Figure 8:
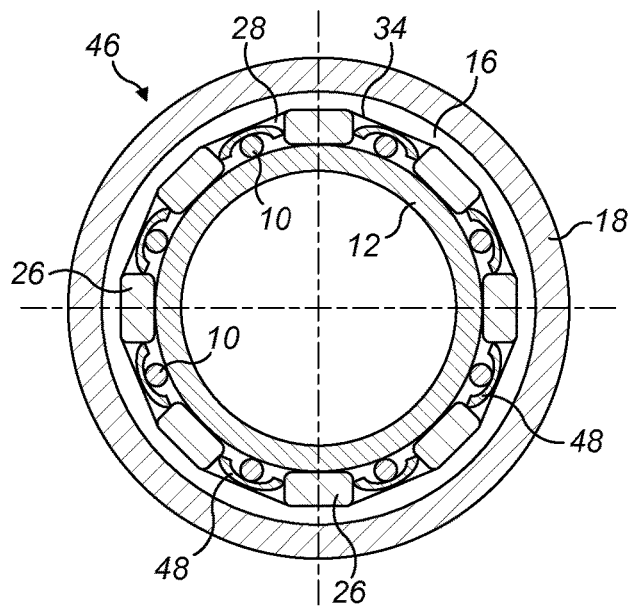
FIGS. 8 to 13 are schematic sectional views of the array of spacer ribs shown in FIGS. 2 and 3, in situ within a PiP assembly, showing different arrangements of the array and of insulation within the assembly.
Figure 9:
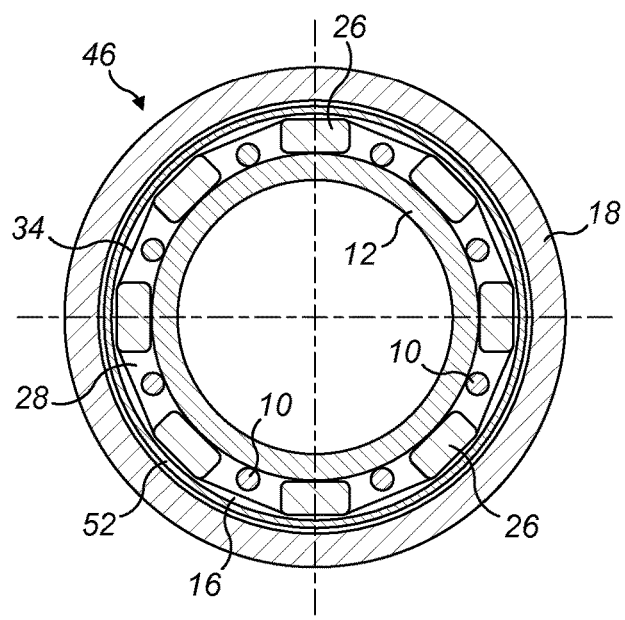
Figure 10:
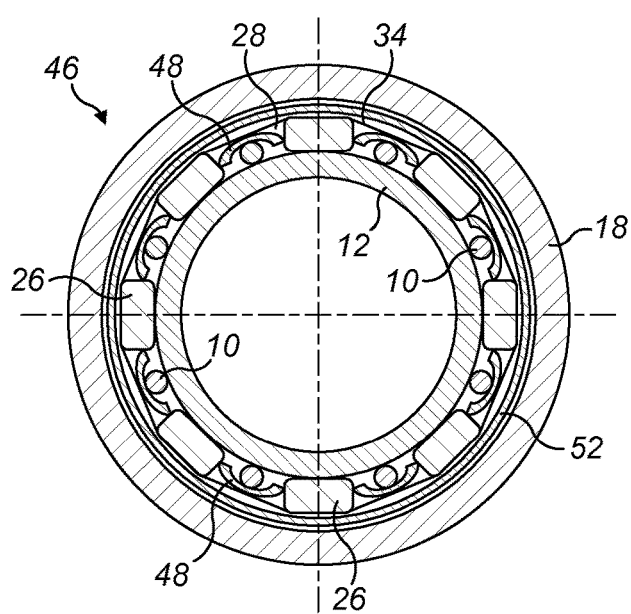
Figure 11:
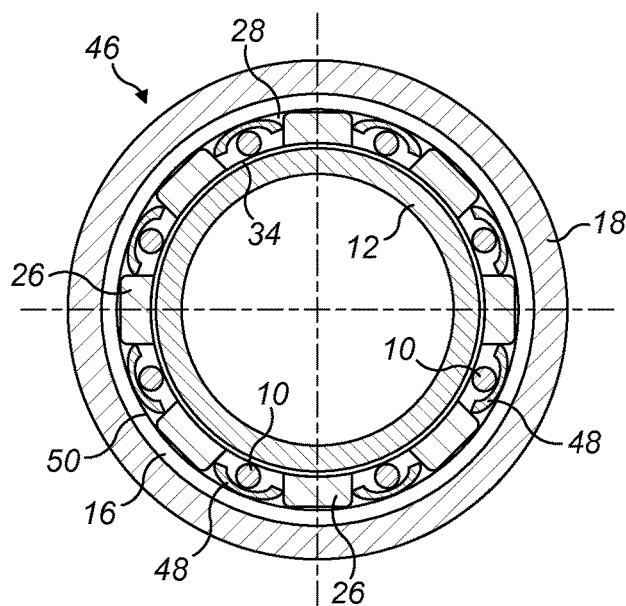
Figure 12:
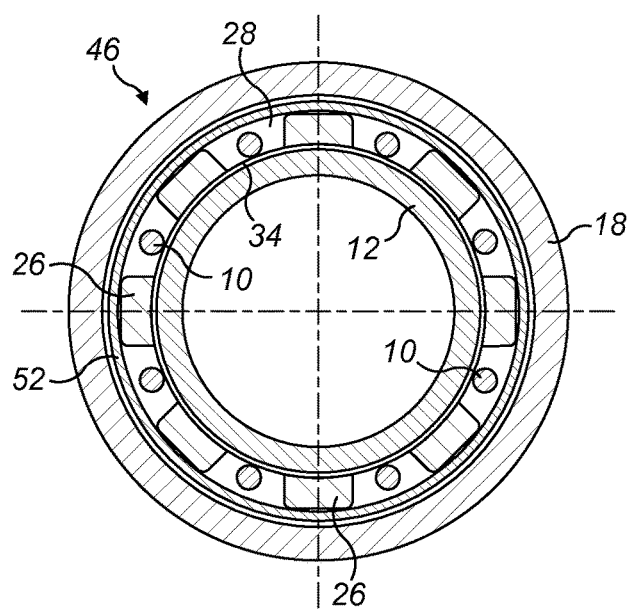
Figure 13:
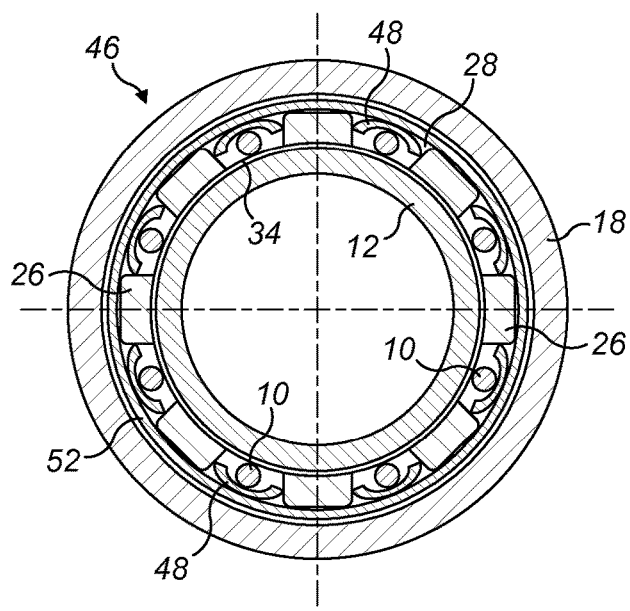

It will be noted that the spacer array 24 is shown inverted in FIG. 3 with the tape 34 on top of the ribs 26 rather than underneath the ribs 26 as shown in FIG. 2. In this respect, the tape 34 may be wrapped around the inner pipe 12 of a PiP assembly either on the radially outer side of the ribs 26 or on the radially inner side of the ribs 26. The lengths of the tape 34 between the ribs 26 may be varied to suit. As will be explained later, the former possibility is shown in FIGS. 8 to 10 whereas the latter possibility is shown in FIGS. 11 to 13.

Figure 4:
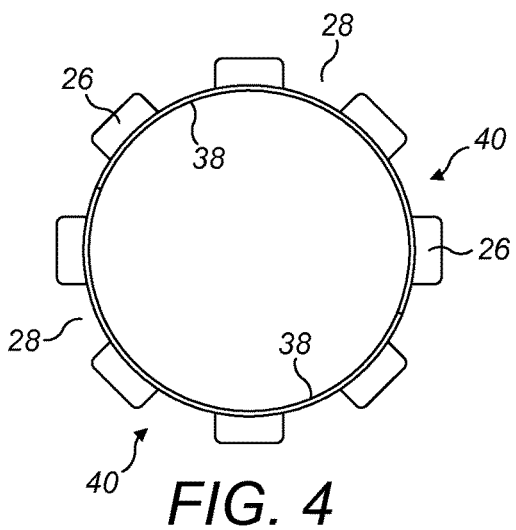
FIGS. 4 to 6 are schematic end views of segmented spacer rings incorporating spacer ribs in accordance with the invention.
Figure 5:
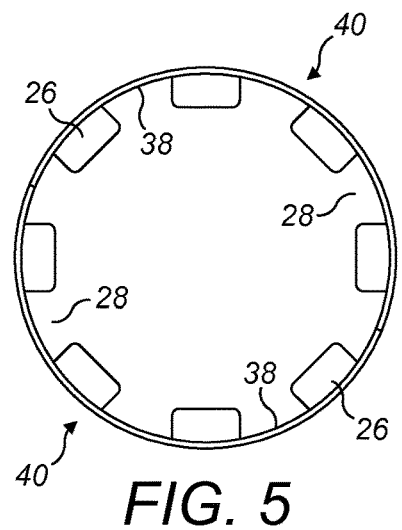
Figure 6:
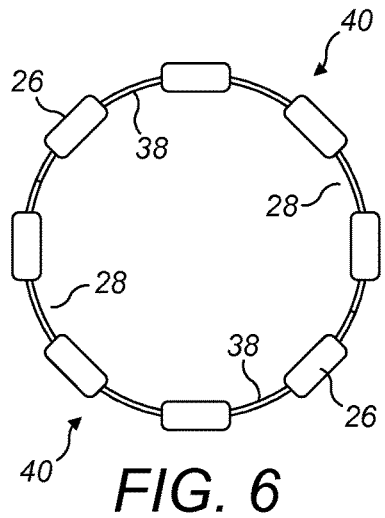

FIGS. 4 to 7 show the ribs 26 supported by pre-shaped curved webs 38 of self-supporting rigidity to form semi-circular segments 40. The segments 40, which are preferably identical, can be assembled as shown in FIGS. 4 to 6 to form a complete circular ring. Again, the ribs 26 may be integral with the webs 38, for example as a one-piece plastics moulding, or may be attached to the webs 38, which may for example comprise curved strips of metal. Whilst essentially rigid, the webs 38 suitably have elastic resilience so as to bow slightly outwardly during assembly to hold the segments 40 on the inner pipe 12.

Figure 7:
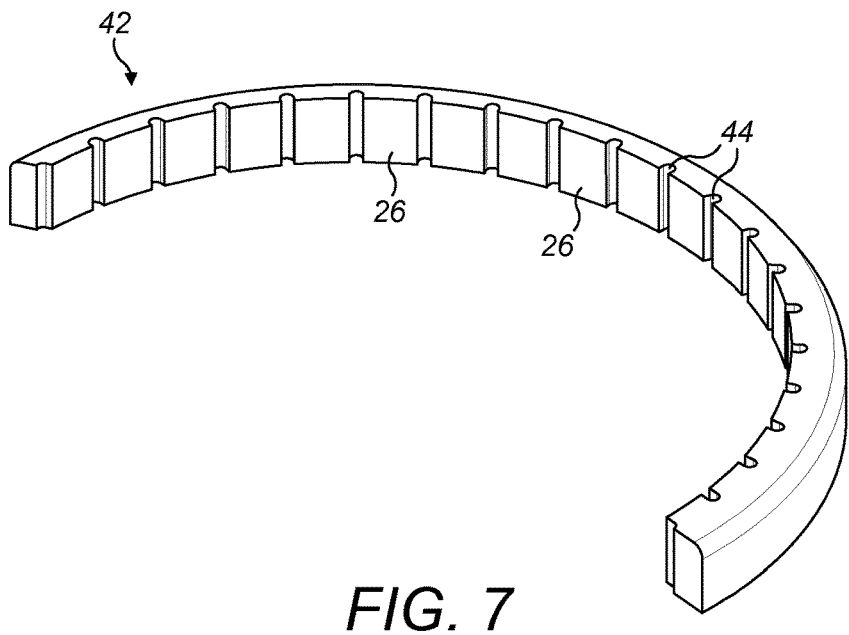
FIG. 7 is a perspective view of a segment of a spacer ring of the invention.

FIG. 4 shows the webs 38 disposed on the radially inner side of the ribs 26. FIGS. 5 and 7 show the webs 38 disposed on the radially outer side of the ribs 26. FIG. 6 shows the webs at a radially intermediate position between the inner and outer faces 30, 32 of the ribs 26.

FIG. 7 shows a semi-circular segment 42 of a spacer array 24, intended to be assembled with a similar segment 42 around the inner pipe 12 to form a full-circumference spacer array 24. It will be apparent here that an inner side of the segment 42 has a circumferential array of channels 44 extending longitudinally through the segment 42 between neighbouring ribs 26. In this example, the channels 44 are oriented to lie parallel to the central longitudinal axis of the inner pipe 12 when the spacer array 24 is assembled around the inner pipe 12. Again, however, the channels 44 could instead be angled to suit a helical arrangement of heating elements 10 if desired.

In this example, each channel 44 has an arched cross-section. The channels 44 are shaped and dimensioned to accommodate typical electric heating elements 10 used in electrically trace-heated PiP systems, preferably without the heating elements 10 touching the sides of the channels 44. The channels 44 may also accommodate some insulation although this is not essential.

Turning now to FIGS. 8 to 13, these show spacer arrays 24 as shown in FIGS. 2 and 3 in situ within a PiP assembly 46. FIGS. 8 to 10 show the tape 34 wrapped around the inner pipe 12 of the PiP assembly on the radially outer side of the ribs 26. This has the advantage that the tape 34 helps to retain the heating elements 10 and any insulating elements in the gaps 28 between the ribs 26. Conversely, FIGS. 11 to 13 show the tape 34 wrapped around the inner pipe 12 of the PiP assembly on the radially inner side of the ribs 26. This has the advantage that the heating elements 10 may more easily be laid in the gaps 28 between the ribs 26 after the spacer array 24 has been wrapped around the inner pipe 12.

FIGS. 8 to 13 have features in common, notably that the electric heating elements 10 are disposed equi-angularly around the inner pipe 12 of the PiP assembly 46. Thus, the heating elements 10 lie within the annulus 16 defined between the inner pipe 12 and the outer pipe 18 of the PiP assembly 46. Air may be evacuated from the annulus 16. Other cables such as fibre-optic data cables may be positioned beside and between the heating elements 10 but have been omitted for clarity.

Each heating element 10 lies within a respective longitudinal passageway defined by a gap 28 between neighbouring ribs 26 of the array. The thickness of the heating elements 10 is less than the radial thickness of the ribs 26, so that the ribs 26 protect the heating elements 10 from crushing and pinching if the annulus 16 narrows as the PiP assembly 46 bends during installation.

FIGS. 8 to 10 show the heating elements 10 in direct contact with the inner pipe 12. Conversely, FIGS. 11 to 13 show the heating elements 10 separated from the inner pipe 12 by the tape 34, which should therefore be of a heat-resistant material. The tape 34 is thin enough to conduct heat effectively from the heating elements 10 to the inner pipe 12. In any event, the tape 34 is narrow enough that it only separates the heating elements 10 from the inner pipe 12 over an insignificantly short longitudinal distance. Thus, the presence of the tape 34 does not materially affect the efficient transfer of heat from the heating elements 10 to the inner pipe 12.

In each of FIGS. 8 to 13, the annulus 16 also contains insulation that overlays the heating elements 10 at least and that may also overlay the ribs 26. Specifically, in FIG. 8 and its counterpart FIG. 11, an insulating element 48 lies in each of the gaps 28 between neighbouring ribs 26. Each insulating element 48 lies on the radially outer side of the heating element 10 that is also housed in that gap 28, and substantially fills the full circumferential width of the gap 28. On their radially inner sides, the insulating elements 48 have concave curvature in cross section to conform with the convex shape of the underlying heating elements 10.

In FIG. 8, the insulating elements 48 are held in the gaps 28 by the surrounding tape 34. In FIG. 11, the insulating elements 48 are held in the gaps 28 by an additional tape 50 that wraps around the radially outer side of the ribs 26 and spans the gaps 28 between the ribs 26, covering the insulating elements 48 and the heating elements 10 that lie in the gaps 28.

Figure 14:
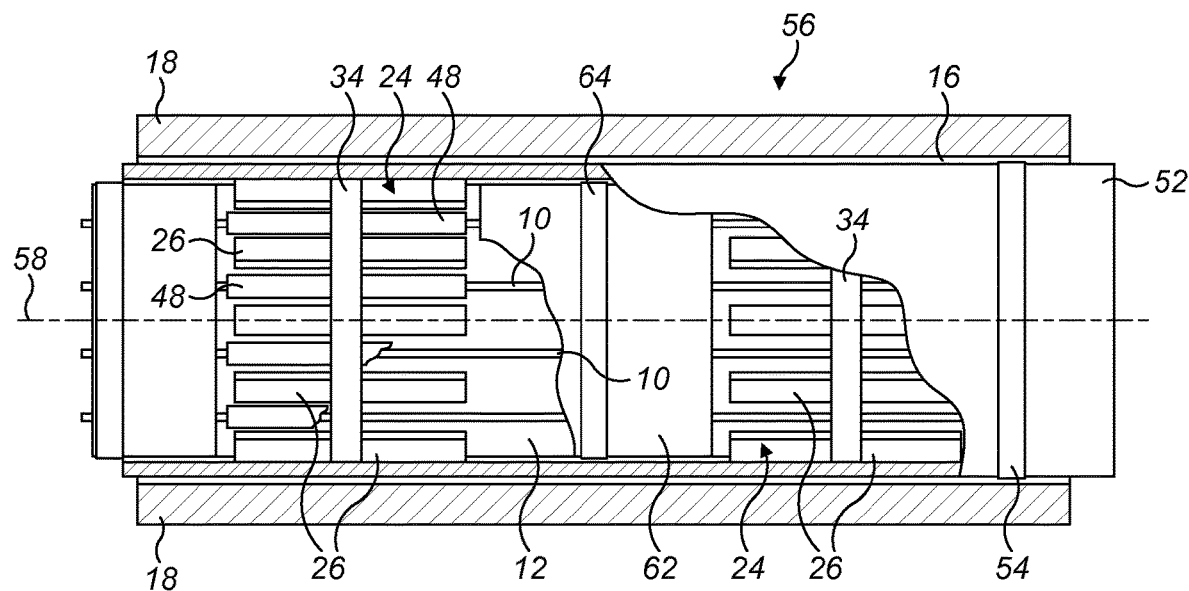
FIGS. 14 and 15 are schematic views of a PiP assembly of the invention in longitudinal section, with insulation partially cut away.

In FIG. 9 and its counterpart FIG. 12, insulating elements 48 are omitted from the gaps 28. Instead, insulation is provided by a wrap or layer of insulation 52 such as an insulating blanket. The layer of insulation 52 extends circumferentially around the radially outer side of the ribs 26 and spans the gaps 28 between the ribs 26, covering and retaining the heating elements 10 that lie in the gaps 28. The layer of insulation 52 may be retained by encircling tapes or bands 54 as shown in FIGS. 14 and 15. There may be more then one layer of insulation.

FIG. 10 and its counterpart FIG. 13 combine the insulating systems of FIGS. 8, 9, 11 and 12. Thus, insulating elements 48 are present in the gaps 28 and additional insulation is provided by a circumferentially-extending layer of insulation 52 around the radially outer side of the ribs 26. The layer of insulation 52 spans the gaps 28 between the ribs 26 to cover and retain the insulating elements 48 and the heating elements 10 that lie in the gaps 28. Again, the layer of insulation 52 may be retained by encircling tapes or bands 54 as shown in FIGS. 14 and 15.

Once assembled in this way, the cylindrical assembly of the inner pipe 12 and the surrounding spacer array 24, heating elements 10, insulating elements 48 and/or layers of insulation 52 may be inserted telescopically into an outer pipe 18. To enable sliding movement, a small clearance, preferably of less than 10 mm, is left between the cylindrical assembly and the inside of the outer pipe 18. A low-friction sliding material such as nylon or PTFE may be wrapped around the cylindrical assembly or applied to its radially outer extremities, notably the radially outer faces of the ribs 26.

Turning finally to FIGS. 14 and 15, these show PiP assemblies of the invention in longitudinal section, with insulation partially cut away for clarity. They differ in that the PiP assembly 56 of FIG. 14 shows the heating elements 10 extending substantially parallel to each other and to a central longitudinal axis 58 of the PiP assembly whereas the PiP assembly 60 of FIG. 15 shows the heating elements 10 angularly offset at an angle of substantially greater than 10° relative to the central longitudinal axis 58. Specifically, FIG. 15 shows a helical arrangement in which parallel heating elements 10 twist around the inner pipe 12 as they extend along its length. Preferably, the ribs 26 lie at the same angle with respect to the central longitudinal axis 58 as shown in FIG. 15. The resulting diagonal relationship between the ribs 26 and the tape 34 of the spacer arrays 24 is evident in this view.

The arrangements shown in FIGS. 14 and 15 are akin to those shown in FIG. 10, with tape 34 on the radially outer side of the ribs 26, insulating elements 48 in the gaps 28 between the ribs 26 and a further layer of insulation 52 wrapped around the ribs 26, the heating elements 10 and the insulating elements 48. In both cases, the further layer of insulation 52 is shown retained by an encircling tape or band 54, which is one of several such tapes or bands 54 that will be spaced along the length of the assembly 56, 60.

FIGS. 14 and 15 show that there may be more than one circumferentially-extending spacer array 24, each comprising rings of circumferentially-spaced ribs 26 encircling the inner pipe 12. Those spacer arrays 24 are shown here spaced longitudinally or axially along the inner pipe 12, with an exemplary distance between them of more than 1.50 m.

The heating elements 10 may be exposed in the longitudinal gap between the spacer arrays 24 but they are preferably insulated by a further annular layer of insulation 62 that encircles the inner pipe 12 to surround the heating elements 10 in that gap. Again, this layer of insulation 62 is retained by an encircling tape or band 64. Advantageously, tightening the encircling tape or band 64 conforms the layer or insulation 62 to the heating elements 10 and clamps the heating elements 10 against the inner pipe 12. This ensures good thermal contact between the heating elements 10 and the inner pipe 12.

An advantage of the helical arrangement of the heating elements 10 in FIG. 15 is that whilst the heating elements 10 are clamped to the inner pipe 12 between the spacer arrays 24, the heating elements 10 are still able to slide relative to the inner pipe 12 elsewhere, for example between the ribs 26 of the spacer arrays 24. At those locations, axial elongation or contraction of the heating elements 10 can be accommodated simply by allowing the angle of the heating elements 10 to change slightly relative to the central longitudinal axis 58.

It will be apparent that by virtue of the longitudinal passageways defined by the gaps 28 between the ribs 26, the PiP assembly of the invention allows heating elements 10 in the annulus 16 to extend continuously along a pipeline through the spacer arrays 24.

In particular, there is no need for additional electrical connections or to interrupt thermal management. The use of insulating elements 48 or layers of insulation 52, 62 between or around the spacer arrays 24 or ribs 26 also enables effective insulation to extend continuously along the pipeline across the spacer arrays 24 and all around the inner pipe 12.

In addition to the variations described above, other variations are possible within the inventive concept. For example, webs, tapes or strips of fabrics may be provided between ribs 26 or between insulating elements 48. Also, as an example of a method of installation, a tubular heat-shrinkable sleeve or web could be slid either with ribs 26 or over pre-installed ribs 26 around the pre-installed heating elements 10, whereupon the web can be heated to shrink it around the ribs 26 and the heating elements 10. Insulation may be disposed radially inside and/or radially outside the web.

Whilst the currently preferred embodiment corresponds to FIGS. 9 and 15 of the drawings, any combination of the design of the ribs, the support band technology and containment band can be considered.

The invention claimed is:

1. A pipe-in-pipe assembly comprising:
    inner and outer pipes in spaced concentric relation to define a thermally-isolating annulus between them, the inner pipe being of steel;
    a plurality of cables extending longitudinally along the annulus outside the inner pipe; and
    thermally-insulating spacers positioned in the annulus to act radially between the pipes; wherein:
    the spacers comprise first and second circumferentially-extending arrays of circumferentially-spaced ribs that define longitudinally-extending passageways in gaps between neighbouring ribs of the arrays, those arrays being spaced longitudinally from each other;
    the cables extend longitudinally along the passageways;
    at least one cable is a heating element positioned for direct contact with the inner pipe in a passageway;
    the radial thickness of the ribs is greater than the thickness of any of the cables; and
    at least one insulation layer is disposed radially outboard of the cables.

2. The assembly of claim 1, wherein the insulating layer comprises insulating elements disposed in the gaps between the ribs.

3. The assembly of claim 1, wherein the insulating layer comprises at least one layer of insulation extending around the inner pipe, positioned radially outboard of the ribs and bridging the gaps.

4. The assembly of claim 3, further comprising at least one band or sleeve encircling the or each layer of insulation and retaining the or each layer of insulation on the ribs.

5. The assembly of claim 1 and comprising at least one layer of insulation extending around the inner pipe, positioned longitudinally between the arrays and radially outboard of the cables.

6. The assembly of claim 5, further comprising at least one band or sleeve encircling the or each layer of insulation between the arrays to clamp the or each layer of insulation and the cables against the inner pipe.

7. The assembly of claim 1, wherein the cables are free for longitudinal or angular movement with respect to the pipe in the gaps between the ribs.

8. The assembly of claim 1, wherein the ribs of each array are joined by a circumferentially-extending band or sleeve.

9. The assembly of claim 8, wherein the band or sleeve joining the ribs is flexible.

10. The assembly of claim 8, wherein the band or sleeve joining the ribs is substantially rigid.

11. The assembly of claim 8, wherein the band or sleeve joining the ribs is separate from the ribs.

12. The assembly of claim 1, wherein the cables extend substantially parallel to each other.

13. The assembly of claim 1, wherein the cables are substantially angularly offset from a central longitudinal axis of the inner pipe.

14. The assembly of claim 13, wherein the passageways defined between the ribs are substantially angularly offset from the central longitudinal axis of the inner pipe.

15. A method of assembling a pipe-in-pipe structure, the method comprising:
    positioning first and second circumferentially-extending arrays of thermally-insulating spacers at longitudinally spaced locations around a steel inner pipe, the arrays comprising circumferentially-spaced ribs defining longitudinally-extending passageways in gaps between neighbouring ribs of the arrays;

positioning a plurality of cables on the outside of the inner pipe such that the cables extend longitudinally along the passageways, wherein the radial thickness of the ribs is greater than the thickness of any of the cables and wherein at least one cable is a heating element positioned for direct contact with the inner pipe in a passageway; and positioning at least one insulation layer radially outboard of the cables.

16. The method of claim 15, wherein the arrays of spacers are positioned before positioning the plurality of cables.

17. The method of claim 15, comprising positioning insulating elements in the gaps between the ribs.

18. The method of claim 15, comprising positioning the arrays of spacers around the inner pipe with the spaced ribs joined by a transversely-extending band or a sleeve.

\* \* \* \* \*